United States Patent
Kandel et al.

(10) Patent No.: US 9,916,927 B1
(45) Date of Patent: Mar. 13, 2018

(54) THIN INSULATION COATINGS BY SOL-GEL METHOD

(71) Applicant: The Florida State University Research Foundation, Inc., Tallahassee, FL (US)

(72) Inventors: Hom Kandel, Tallahassee, FL (US); Jun Lu, Tallahassee, FL (US); Youri Viouchkov, Tallahassee, FL (US); Scott Gundlach, Tallahassee, FL (US); Adam Voran, Tallahassee, FL (US); William D. Markiewicz, Monticello, FL (US)

(73) Assignee: The Florida State University Research Foundation, Inc., Tallahassee, FL (US)

( * ) Notice: Subject to any disclaimer, the term of this patent is extended or adjusted under 35 U.S.C. 154(b) by 3 days.

(21) Appl. No.: 15/081,377

(22) Filed: Mar. 25, 2016

Related U.S. Application Data

(62) Division of application No. 14/134,665, filed on Dec. 19, 2013, now abandoned.
(Continued)

(51) Int. Cl.
*C23C 18/31* (2006.01)
*C04B 28/24* (2006.01)
(Continued)

(52) U.S. Cl.
CPC .......... *H01F 41/127* (2013.01); *C04B 28/24* (2013.01); *H01F 6/06* (2013.01); *H01F 41/048* (2013.01)

(58) Field of Classification Search
CPC ....... C23C 18/31; C04B 28/24; C09D 183/02; C08L 83/02; H01B 3/12; H01B 13/16; H01F 6/06; H01F 41/127; H01F 41/048
(Continued)

(56) References Cited

U.S. PATENT DOCUMENTS

| | | | | |
|---|---|---|---|---|
| 5,514,211 A | * | 5/1996 | Marks | C09D 183/02 106/287.16 |
| 5,662,961 A | * | 9/1997 | Tanitsu | C09D 183/02 427/379 |

(Continued)

OTHER PUBLICATIONS

Lu. J., et al., Insulation of Coated Conductors for High Field Magnet Applications. IEEE Transactions on Applied Superconductivity, vol. 22, No. 3, Jun. 2012.

*Primary Examiner* — Helene Klemanski
(74) *Attorney, Agent, or Firm* — Paul Murty; Robert Varkonyi; Smith & Hopen, P.A.

(57) ABSTRACT

Electrically insulating $Al_2O_3$—$SiO_2$ thin coatings have been deposited on long-length 316 stainless steel (SS) tape using a reel-to-reel continuous sol-gel dip coating process for co-winding insulation into YBCO pancake coils, a high temperature superconductor magnet technology. Coatings with a thickness of ~2 μm are achieved after just one dip with a tape withdrawal speed of ~16 mm/s (1 m/min) and a calcination at 700° C. The coatings were measured to have a room-temperature breakdown voltage of about 100 V, corresponding to a dc dielectric strength of about 50 MV/m. Consequently, this process has low cost and high throughput and produces a thin electrical insulation with excellent thermal, dielectric, and mechanical properties. A new technique has been developed in the coating process to mitigate coating buildup near the edges of the tape.

6 Claims, 8 Drawing Sheets

Related U.S. Application Data

(60) Provisional application No. 61/739,304, filed on Dec. 19, 2012.

(51) Int. Cl.
*C09D 183/02* (2006.01)
*C08L 83/02* (2006.01)
*H01B 3/12* (2006.01)
*H01B 13/16* (2006.01)
*H01F 6/06* (2006.01)
*H01F 41/12* (2006.01)
*H01F 41/04* (2006.01)

(58) Field of Classification Search
USPC .......................................... 106/1.25, 287.16
See application file for complete search history.

(56) References Cited

U.S. PATENT DOCUMENTS

| | | | | |
|---|---|---|---|---|
| 5,879,437 A * | 3/1999 | Hartman | ............ | C09D 183/02 |
| | | | | 106/287.1 |
| 6,344,287 B1 * | 2/2002 | Celik | ................... | B32B 15/01 |
| | | | | 174/125.1 |
| 8,354,165 B2 * | 1/2013 | Glaubitt | ............... | C09D 183/02 |
| | | | | 106/2 |
| 2010/0276288 A1 * | 11/2010 | Hovestad | ............. | C09D 183/02 |
| | | | | 205/50 |
| 2012/0103231 A1 * | 5/2012 | Ishihara | ............... | C09D 183/02 |
| | | | | 106/287.11 |
| 2015/0210871 A1 * | 7/2015 | Anton | .................. | C09D 183/02 |
| | | | | 524/430 |

* cited by examiner

THIN INSULATION COATINGS BY SOL-GEL METHOD

CROSS-REFERENCE TO RELATED APPLICATIONS

This application is a divisional of and claims priority to U.S. patent application Ser. No. 14/134,665, entitled "Thin Insulation Coatings by Sol-Gel Method," filed Dec. 19, 2013, now abandoned, which claims priority to provisional U.S. Patent Application No. 61/739,304 entitled, "Thin $Al_2O_3$—$SiO_2$ Composite Coating on Stainless Steel Tape for Co-Winding Insulation in High Temperature Superconductor (HTS) YBCO Magnet," filed on Dec. 19, 2012 by the same inventors, and is hereby incorporated by reference in its entirety.

FEDERALLY SPONSORED RESEARCH OR DEVELOPMENT

This invention was made with government support under contract #DMR0654118 awarded by the National Science Foundation. The government has certain rights in the invention.

BACKGROUND OF THE INVENTION

1. Field of the Invention

This invention relates to conductor insulation. More specifically, it relates to a method and apparatus for manufacturing $Al_2O_3$—$SiO_2$ coated stainless steel tape or wire. The present invention also relates to a method and apparatus for insulating high temperature superconducting magnets.

2. Brief Description of the Related Art

Electrical insulation is vital to any superconducting magnets including the HTS magnets to prevent the electrical short circuits within the winding of the conductor coils. However, there are several challenges that make the development complex. First, the insulation must have excellent dielectric, mechanical, and thermal properties and it must operate at cryogenic temperatures and high mechanical stresses (Lorenz forces). Second, the insulation has to be very thin to maximize the engineering current density in the magnet coil. Third, the insulation technique has to be compatible with all other aspects of magnet construction. Fourth, it should be capable of high throughput and be low in cost.

Ceramic coatings on metal, such as stainless steel tapes and wires, through the dip coating process provide a viable option for such insulation requirements because of their very good thermal and electrical (dielectric) properties.[1] Brinker and Scherer produced silica films having quite high breakdown strengths (up to 600 MV/m) and insulating properties approaching those of thermally grown silica.[2] Schmidt and Wolter reported ormocers for dielectric applications.[3] Similarly, $ZrO_2$— and $Al_2O_3$—based ceramic insulation coatings have been reported in the literature.[4]

There are several techniques for coating metals with ceramic layers: physical vapor deposition, chemical vapor deposition, plasma spraying, electrophoresis, and sol-gel. However, sol-gel technology is very simple, easy for operation, cost effective, and a low-temperature open-atmosphere-solution-based coating method. Using this process, it is possible to deposit films and coatings with a thickness from ~10 nm to several micrometers with advantages of good homogeneity and ease of composition control in the films. The principle of the technology is that a film of the precursor solution is distributed onto a substrate, where it undergoes the sol-to-gel transformation. The gel layer is calcined to remove the volatile organic components and densify the coating. The coatings obtained after the calcination provide a good adherence with metallic substrates. Large planar or axially symmetric substrates may be uniformly coated with a batch or a continuous process, and the system can be easily scaled up for coating kilometers long tapes or wires using a reel-to-reel continuous process. This technology has been successfully used for many applications including the preparation of fine glass and ceramics, organic-inorganic and hybrid coatings, oxide coatings for optical and electronic applications, and thin layers of ceramic insulations for superconducting magnet applications.[5]

Up to now, wrappings of adhesive-backed tapes (such as polyimide or polytetrafluoroethylene) or the coatings of polymers (such as varnish, epoxy, and acrylates) are used as insulation for ReBCO coated conductors. The coated conductor manufacturers can provide insulated conductors which have polyimide tape wrapping around the conductor. Since the thickness of a coated conductor itself is about 100 μm, the conventional fiberglass insulation or polymide film with adhesives (Kapton), typically 50 μm or thicker, significantly decreases the magnet packing factor and hence reduces the engineering current density. The thinnest insulating materials available so far are far thicker than the present invention. Sol-gel derived coatings including $ZrO_2$ were developed in the past for coating the superconducting tape and wires, but these processes require very large number of dip coatings to achieve the same thickness as obtained by onetime dip coating in the present invention, thus giving a low throughput and the higher cost. In addition, the coating solutions were not stable for long periods of time, which is another difficulty to implement for longer length coating.

However, in view of the art considered as a whole at the time the present invention was made, it was not obvious to those of ordinary skill in the field of this invention how the shortcomings of the prior art could be overcome.

BRIEF DESCRIPTION OF THE DRAWINGS

For a fuller understanding of the invention, reference should be made to the following detailed description, taken in connection with the accompanying drawings, in which.

cross-sectional view showing a coating buildup along the edge section in accordance with various embodiments.

Figure 6:
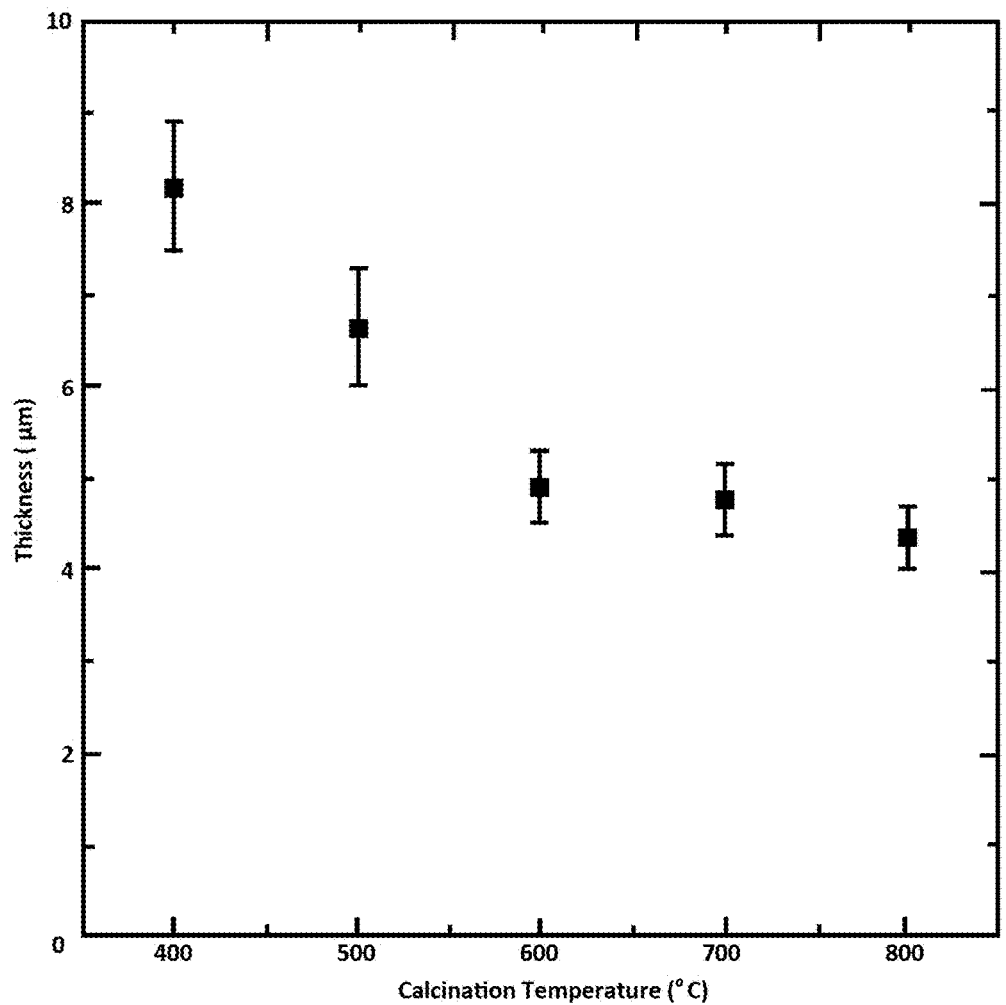

FIG. 6 depicts a graph illustrating thickness as a function of calcination temperature in alumina-silica two-layer sol-gel dip-coated samples in accordance with various embodiments.

Figure 7:
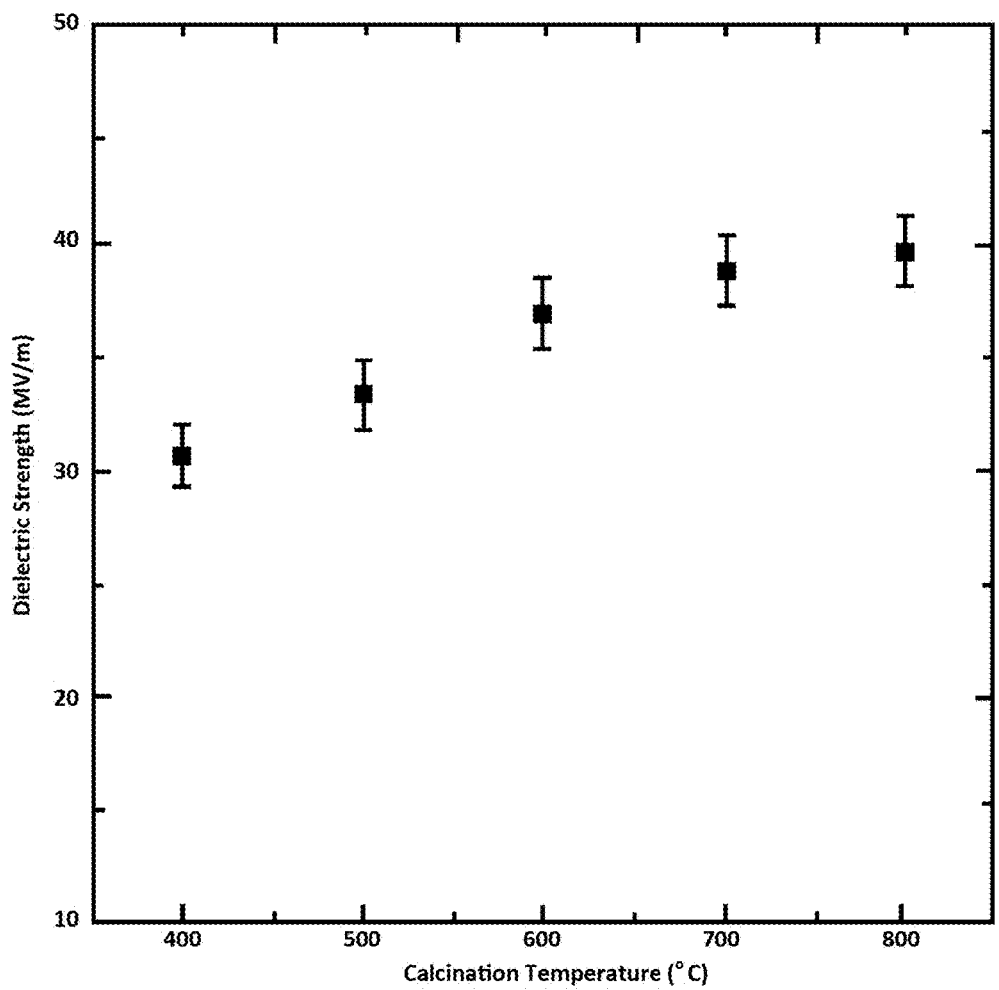

FIG. 7 depicts a graph illustrating dielectric strength as a function of calcination temperature in two-layer alumina-silica sol-gel dip-coated samples on stainless steel tape in accordance with various embodiments.

Figure 8:
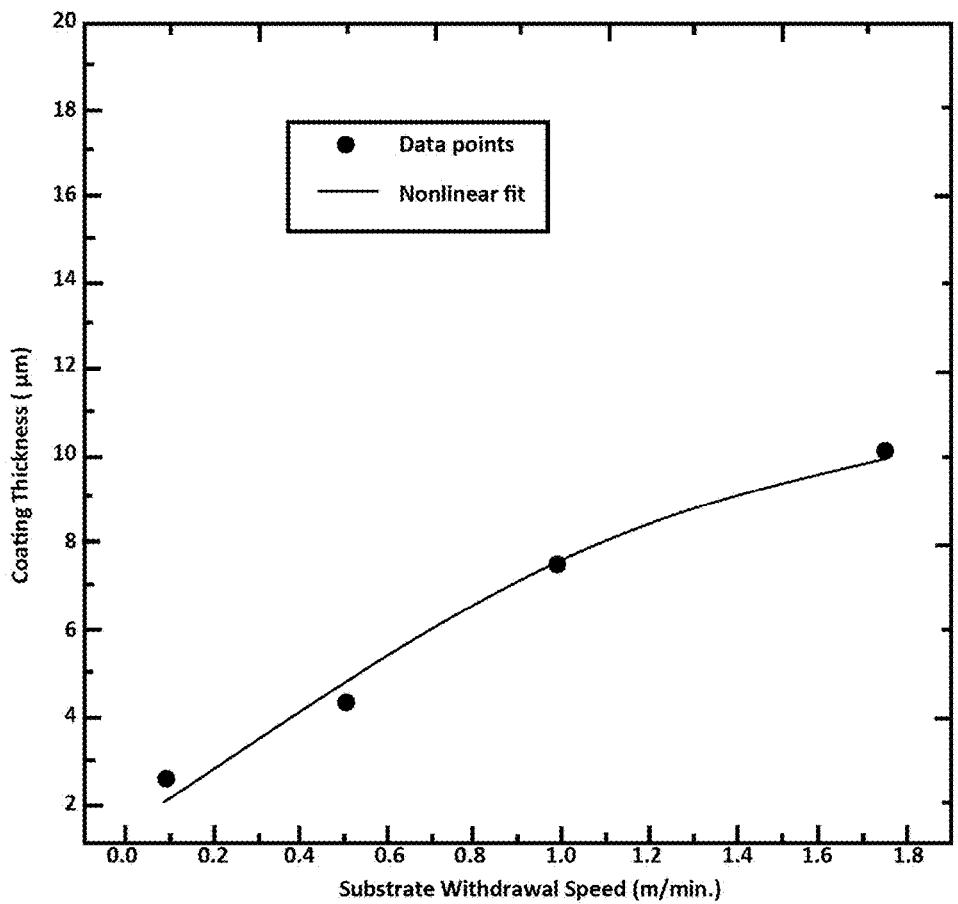

FIG. 8 depicts a graph illustrating coating thickness as a function of substrate withdrawal speed in alumina-silica two-layer sol-gel dip-coated samples in accordance with various embodiments.

DETAILED DESCRIPTION OF THE PREFERRED EMBODIMENT

In the following detailed description of the preferred embodiment, reference is made to the accompanying drawings, which form a part hereof, and within which are shown by way of illustration specific embodiments by which the invention may be practiced. It is to be understood that other embodiments may be utilized and structural changes may be made without departing from the scope of the invention.

As used in this specification and the appended claims, the singular forms "a", "an", and "the" include plural referents unless the content clearly dictates otherwise. As used in this specification and the appended claims, the term "or" is generally employed in its sense including "and/or" unless the context clearly dictates otherwise.

Various embodiments of the present invention include compositions and methods for coating a metallic tape or wire. An exemplary composition may comprise one part by weight alkyl silicate binding material, two parts by weight anhydrous ethyl alcohol, and 3/10 part by weight aluminum oxide powder. An exemplary method may comprise providing a mixture comprising one part by weight alkyl silicate binding material, two parts by weight anhydrous ethyl alcohol, and 3/10 part by weight aluminum oxide powder, applying a coating of the mixture onto the tape or wire by immersing the tape or wire into the mixture and removing the tape or wire at a predetermined withdrawal speed, drying the coating, and calcinating the coating. Exemplary methods may also comprise removing a portion of the applied coating after the tape or wire is removed from the mixture and prior to the drying step.

The present invention is for co-winding on HTS YBCO coated conductor to not only provide additional reinforcement, but also provide a better way to prevent the possible damage on the coated conductor if coating were directly applied on it. In addition, it overcomes the temperature restriction during the coating process. Another advantage of the present invention is that the much thicker coatings are obtained than found in the conventional sol-gel techniques and thus reducing the number of coating process to achieve the same thickness.

The present invention may produce thicker coatings of more uniform thickness than conventional sol-gel techniques, thus reducing the number of coating steps to achieve a given coating thickness. The resulting coating may also provide better dielectric, mechanical, and thermal properties. Coatings with a thickness of about 2 µm may be achieved after just one dip with a tape running speed of 1 m/min. The coatings have been measured to have a room-temperature breakdown voltage of about 100 V, corresponding to a DC dielectric strength of about 50 MV/m. A mechanical fatigue test of 1,000 cycles to 0.65 percent tensile strain at 4.2K has shown no flaking, cracking or spalling. Various embodiments may also mitigate excessive coating buildup near the edges of the stainless steel tape an air knife technique described herein.

Figure 1:
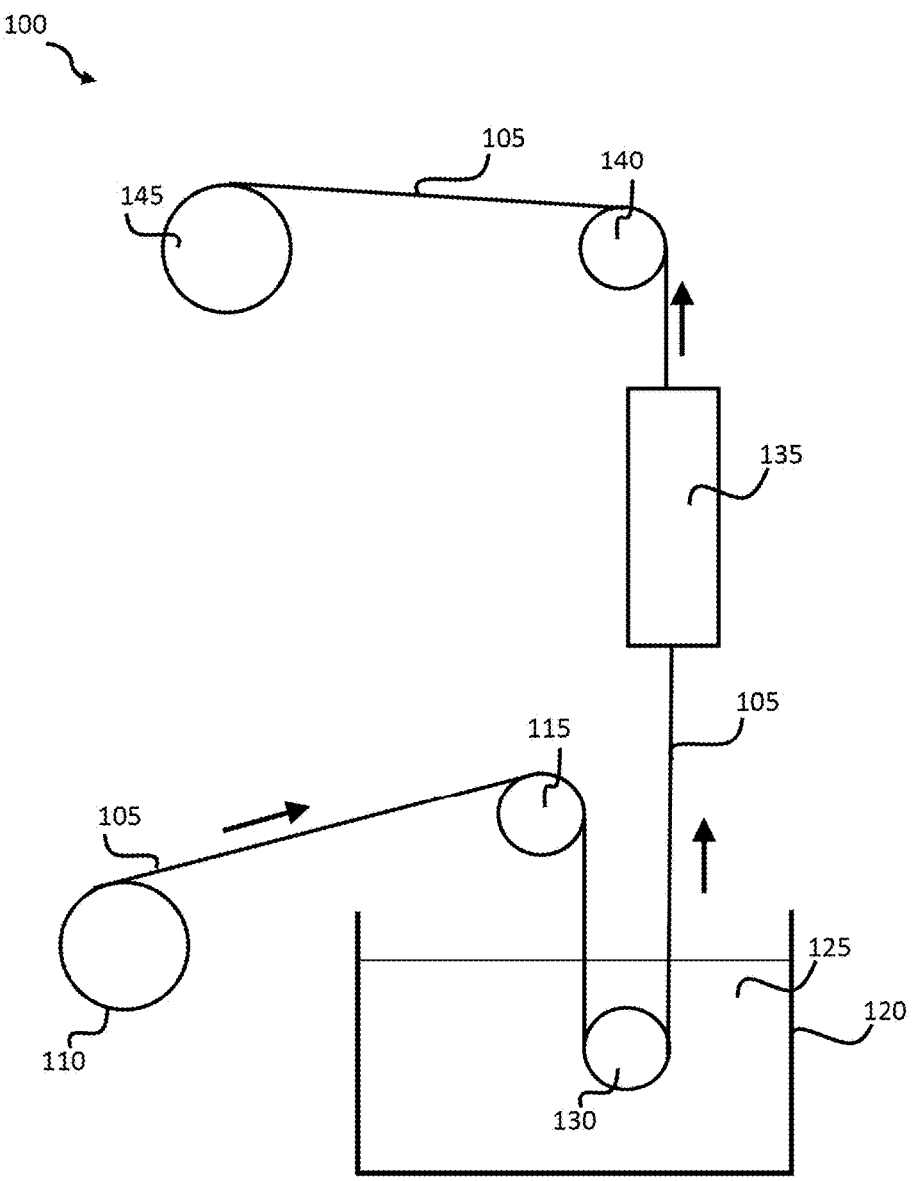
FIG. 1 depicts a schematic diagram of a device for continuous dip coating of metallic tape or wire in accordance with various embodiments.

FIG. 1 illustrates various embodiments of a device 100 to apply a coating to a metal tape or wire. A length of the tape or wire 105 may be wound around a pay-off spool 110 that rotates to allow the tape 105 to be drawn through the device 100. The arrows in FIG. 1 indicate the direction of travel of the tape 105 through the device 100. The tape 105 may pass over one or more input pulleys 115 to properly orient the tape 105 for passage through the device 100. The input pulleys 115 may individually be coupled to a motor (not shown) or may be free to rotate. The tape may be directed into a dip tank 120 containing coating solution 125, where it may pass over one or more dip tank pulleys 130 to direct the tape 105 out of the dip tank 120. After exiting the dip tank 120, the coated tape 105 may pass through a furnace 135. The furnace 135 may comprise a single stage or multiple stages. In various embodiments, the furnace 135 comprises a first stage to dry the coating 125 and a second stage to calcinate the coating 125. The first and second stages of the furnace 135 may operate at different temperatures. After exiting the furnace 135, the tape 105 may pass over one or more exit pulleys 140 which may be individually coupled to a drive motor (not shown) or may be free to rotate. The coated tape 105 may then be collected on a take-up spool 145. The take-up spool may be coupled to a drive motor (not shown) such that the take-up spool 145 operates to provide the motive force to move the tape 105 through the device 100. In various embodiments, the tape 105 is moved through the device 100 in order to achieve a withdrawal speed of the tape 105 from the dip tank 120 ranging from about 0.1 m/min to about 1 m/min.

Figure 2A:
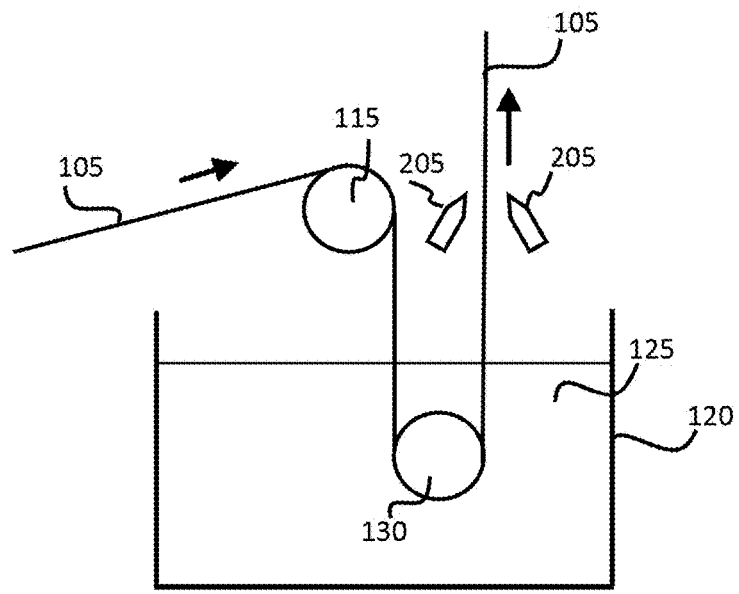
FIG. 2A depicts a schematic diagram of a dip tank of a device for continuous dip coating showing placement and orientation of air knives in accordance with various embodiments.
Figure 2B:
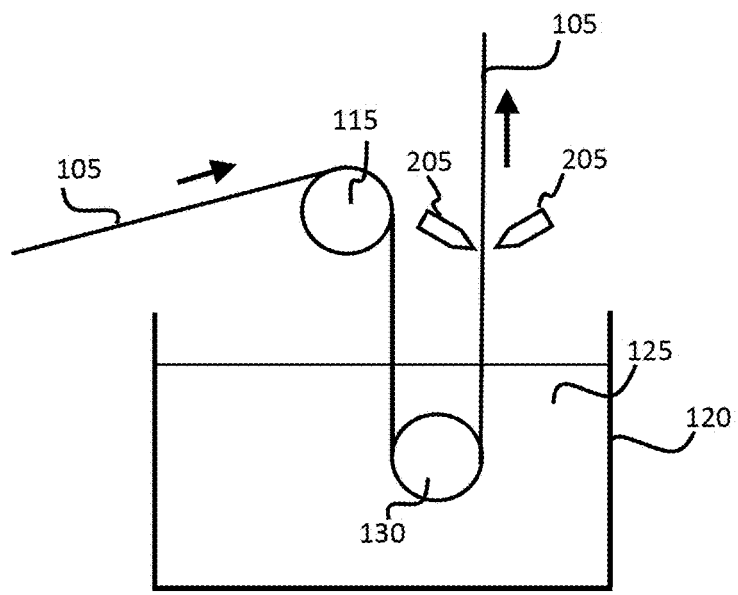
FIG. 2B depicts a schematic diagram of a dip tank of a device for continuous dip coating showing placement and orientation of air knives in accordance with various embodiments.

Various embodiments as illustrated in FIGS. 2A and 2B may also comprise two or more air knives 205 positioned between where the tape 105 exits the dip tank 120 and before entering the furnace 135. The air knives 205 may be oriented in any manner that achieves a desired coating thickness and uniformity. For example, FIG. 2A illustrates various embodiments in which the air knives 205 are oriented in the direction of travel of the tape 105. In other embodiments, the air knives 205 may be oriented against the direction of travel of the tape 105 as illustrated in FIG. 2B. In still other embodiments (not shown), the air knives 205 may be oriented essentially perpendicular to the tape 105, or each air knife 205 may be positioned independent of the other air knives 205. The angle of orientation of the air knives 205 relative to the tape 105 may be adjustable.

Coating was carried out using 4 mm wide and 25 µm thick commercially available stainless steel tape with a cold rolled number 2 bright finish. The coating solution was prepared by mixing one part by weight of an alkyl silicate binding material, two parts by weight of anhydrous ethyl alcohol, and three-tenths part by weight of aluminum oxide ($Al_2O_3$) powder. In various embodiments, the coating solution may form a sol-gel solution comprising $Al_2O_3$ fine ceramic powder dispersed in alkyl silicate sol. The sol-gel solution to powders loading ratio was fixed at a composition that contained enough sol-gel solution to adequately bind the powders and a sufficient powder to produce thick and adherent coating. The solution was ultrasonicated to ensure the complete dispersion of the $Al_2O_3$ powders in the sol and it was stirred throughout the coating process with a magnetic stirrer to prevent the sedimentation of the powder. The viscosity of this sol-gel solution was measured to be 0.003

Pa. sec at 25° C. In various embodiments, the viscosity at 25° C. may range from about 0.001 Pa. sec to about 0.005 Pa. sec. The coating may then be dried at about 300° C. and calcinated at about 700° C. for densification. In various embodiments, the drying temperature may range from about 200° C. to about 400° C., and the calcinating temperature may range from about 600° C. to about 800° C.

Figure 3:
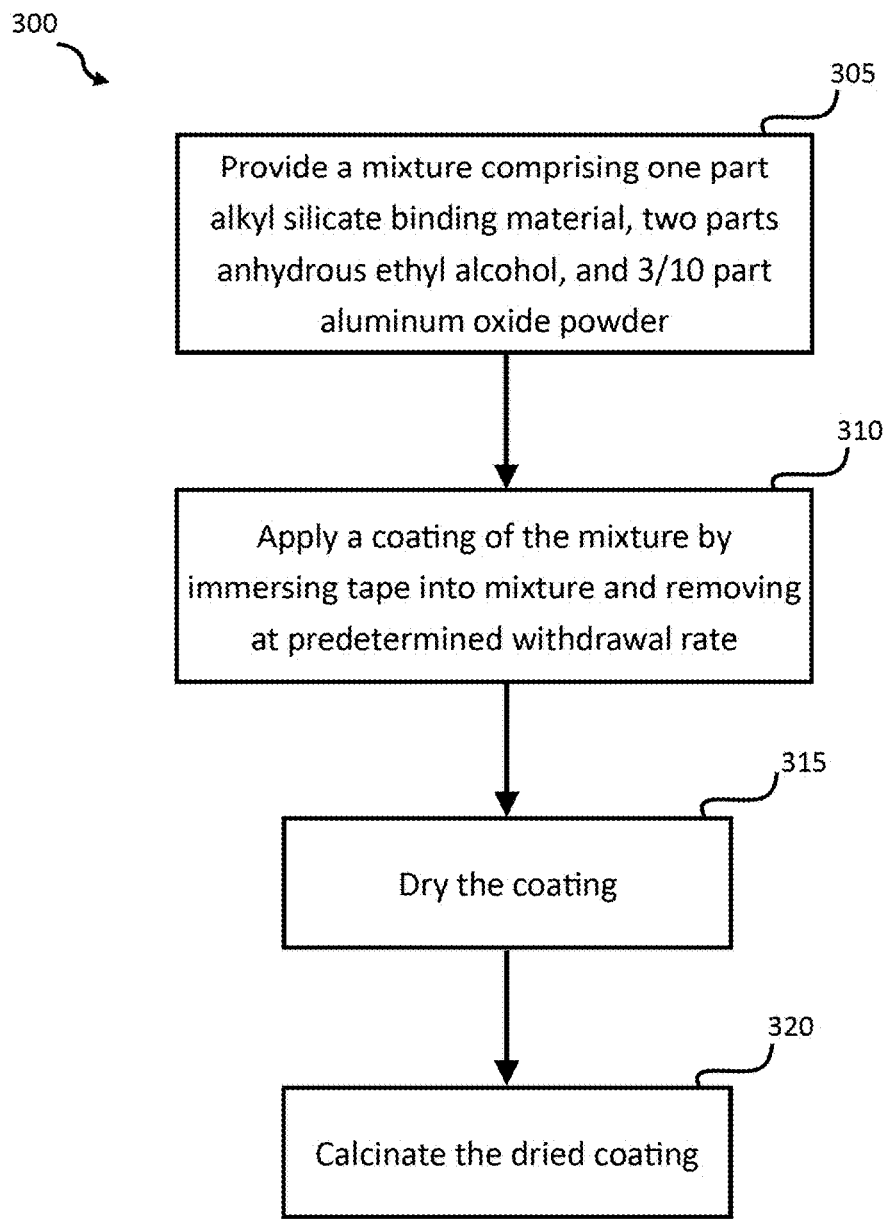
FIG. 3 is a general flow chart of an exemplary method for coating metallic tape or wire.
Figure 4:
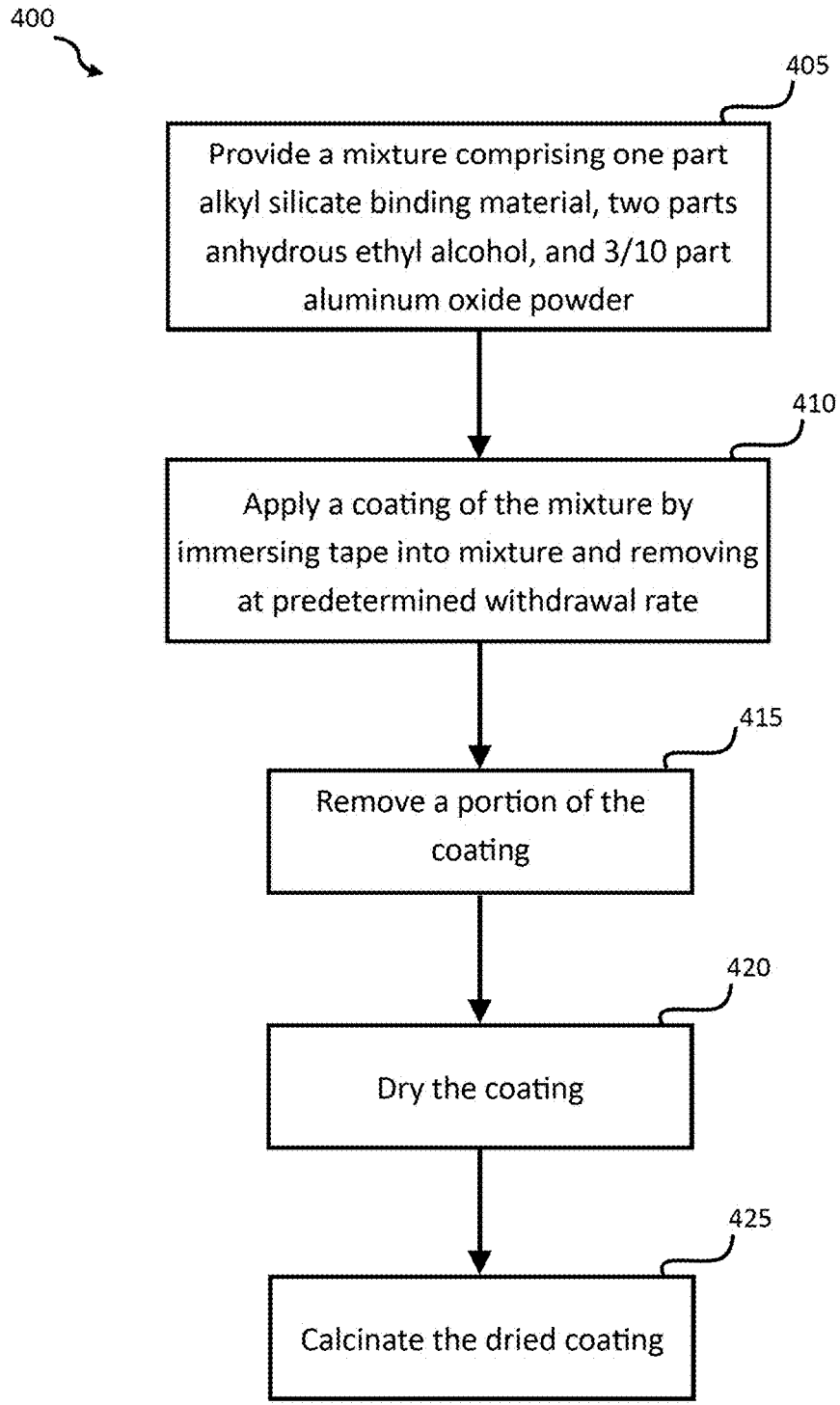
FIG. 4 is a general flow chart of an exemplary method for coating metallic tape or wire.

FIG. 3 illustrates various embodiments of a method 300 for coating a metallic tape or wire. At step 305, a mixture may be provided comprising one part alkyl silicate binding material, two parts anhydrous ethyl alcohol, and 3/10 part aluminum oxide powder. A coating of the mixture may be applied by immersing the tape or wire into the mixture and removing the tape or wire at a predetermined withdrawal rate (step 310). The coating may then be dried at step 315, followed by calcinating at step 320. FIG. 4 illustrates another method 400 according to various embodiments in which steps 405 and 410 correspond to steps 305 and 310 of method 300. At step 415, a portion of the coating may be removed from the tape or wire. The coating profile may be reshaped using air knives (see FIGS. 2A and 2B and discussion above), or by any other method or device known in the art such as physical contact between the tape or wire and a doctor blade or roller. The coating may then be dried at step 420, followed by calcinating at step 425.

The alkyl silicate binding material may comprise ethylpolysilicate dissolved in an alcohol, and may comprise at least 19 percent by weight silicon dioxide. The aluminum oxide powder may comprise deagglomerated aluminum oxide powder and may have a particle size of about 0.3 μm. In various embodiments, the alkyl polysilicate material may be Silbond® H-5 supplied by Silbond Corp., Weston, Mich.

The coating after calcination may be a ceramic composite material consisting of a $SiO_2$ thin-film matrix with $Al_2O_3$ powders dispersed throughout. The average thickness of one layer dip coated samples may be about 2 μm with a breakdown voltage of about 100 V corresponding to the dielectric strength of about 50 MV/m. This method produces much thicker and adherent films through the control of microstructures and also avoids cracking.

The mechanical integrity of the sol-gel insulation was investigated with visual inspection of a 100 mm long stainless steel test sample before and after mechanical tensile tests at 4K temperature. A cyclic fatigue test (1,000 cycles, max Stress=1,300 MPa, R=0.1) showed very good mechanical integrity with no flaking, cracking or spalling. Scratch resistance tests were performed at various sections of the coated stainless steel tapes. The results showed that the coating did not fail until the applied force reached 5 N using a stylus with a 0.25 mm diameter spherical tip and indicated that the coating is firmly adhered on the tape.[6] The high adherence of the coating is believed to result from the formation of strong covalent bonds between the film and the metallic substrate.[7]

Microstructure

Figure 5:
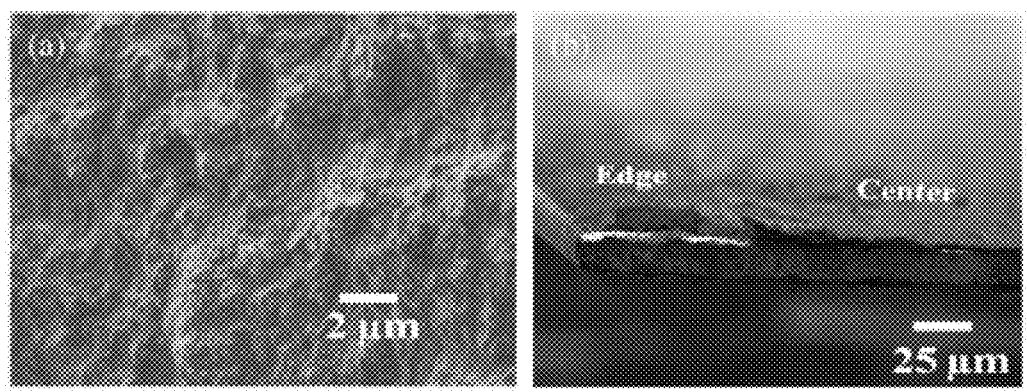
FIG. 5 depicts SEM images of two layer silica-alumina dip-coated stainless steel tape. (a) surface view and (b)

FIG. 5 shows SEM images of surface (a) and cross-sectional (b) views of the two-layer $Al_2O_3$—$SiO_2$ dip-coated stainless steel tapes. The surface of the coating is very rough due to the presence of the $Al_2O_3$ particles in the coating. The $Al_2O_3$ particles are uniformly distributed in the $SiO_2$ matrix, and the overall coating is well adherent on the substrate. Some micron sized cracks can be observed. However, these micro cracks do not affect the overall performance of the insulation because the measured dielectric strength is much greater than that of air of 3 MV/m.[8] The cracks may be caused by the thermal expansion mismatch between the stainless steel tape and the film materials. The cross-section of the coating shows that the average coating thickness for two layer dip-coated sample is about 5 μm in the middle section of the tape and increases significantly along the edges of the tape.

Effect of Calcination Temperature

The $Al_2O_3$—$SiO_2$ dip-coated stainless steel tapes were calcined at temperatures from 400° C. to 800° C. to study the effect of various calcination temperatures. The values of thickness, breakdown voltage, and dielectric strength of the two-layer dip-coated samples as a function of calcination temperatures are shown in Table 1 and FIGS. 6 and 7. The film thickness is reduced significantly when the film is calcined at higher temperatures. The increase in the dielectric strength with the calcination temperature seems to be consistent with the increase of the coating density.

TABLE 1

Thickness and Dielectric Strength as a Function of Calcination Temperature in Two-Layer Dip-Coated Alumina-Silica Coatings

| Calcination Temperature (° C.) | Thickness (μm) | Breakdown Voltage (V) | Dielectric Strength (MV/m) |
|---|---|---|---|
| 400 | 8.0 | 248 | 31 |
| 500 | 7.0 | 238 | 34 |
| 600 | 5.5 | 209 | 38 |
| 700 | 5.0 | 200 | 40 |
| 800 | 4.5 | 185 | 41 |

Effect of the Substrate Withdrawal Speed

In general, thickness (h) of the dip-coated film is related to the substrate withdrawal speed (U) in meters per second, the viscosity (η) of the solution in newton seconds per square meter, the surface tension (τ) of the solution in newtons per meter, the density (ρ) of the solution in kilograms per cubic meter, and the acceleration due to gravity in kilogram meters per second squared by the Landau and Levich formula $h=aU^{2/3}$ m, where $$a = \frac{0.94\eta^{\frac{2}{3}}}{\tau^{\frac{1}{6}}(\rho g)^{\frac{1}{2}}} m^{\frac{1}{3}} s^{\frac{2}{3}}.$$

Thus, according to this formula, thinner films can be obtained from the same solution by decreasing the substrate withdrawal speed or the viscosity of the solution.

FIG. 8 shows the dependence of the film thickness on the withdrawal speed of tape where the thickness increases with the increase of withdrawal speed as expected in the Landau and Levich formula. The nonlinear fitting of the experimental data is in agreement with this formula. The fitting was done for the formula $h=aU^{2/3}$ with a as the fitting parameter. The value of "a" has been found to be 0.00049 $m^{1/3} \cdot s^{2/3}$ which is close to the estimated value.

Effect of the Air Flow

The thickness buildup near the edges of the substrate tape, also called fat edges, is found in the $Al_2O_3$—$SiO_2$-coated stainless steel tapes. To solve the problem of the thickness buildup near the edges of the tape, an air flow mechanism using aluminum air nozzle in the sol-gel dip coating system (see FIGS. 2A and 2B). Air was blown on both sides of the tape at 4 cm above the dip tank using the aluminum air nozzle which produced an air spray pattern over 4 mm×10 mm strip of the tape. The air flow was controlled by an air flow controller connected adjacent to the air nozzle. During the coating process, a portion of the wet coating was observed draining near the meniscus regime (drainage regime) due to gravity and surface tension until immobilized by gelling, or drying. When the air flow impinged on the drainage regime with a higher flow rate of air, e.g., about 0.000628 m$^3$/s (80 standard cubic feet per hour), an air brush effect is observed which allows the coating to thin and spread out on the tape surface. The thickness of the coating buildup along the edges of SS tape can reduce by more than half by flowing air across the running SS tape with the aid of the air nozzle as shown in Table 2.

TABLE 2

Thickness of One-Layer Coated Alumina-Silica Coating on Stainless Steel Tape Before and After Air Flow

| Sample | Center Thickness (μm) | Edge Thickness (μm) |
|---|---|---|
| Before Air Flow | | |
| 1 | 2.0 | 5.0 |
| 2 | 2.0 | 5.0 |
| 3 | 3.0 | 6.0 |
| 4 | 2.0 | 5.0 |
| Average | 2.2 | 5.2 |
| After Air Flow | | |
| 1 | 2.0 | 2.5 |
| 2 | 2.0 | 2.0 |
| 3 | 1.5 | 1.5 |
| 4 | 1.5 | 2.0 |
| Average | 1.7 | 2.0 |

REFERENCES

1. C. J. Brinker and G. W. Scherer, *Sol-Gel Science: The Physics and Chemistry of Sol-Gel Processing*. San Diego, Calif.: Academic, 1990; D. L. Vasconcelos, J. Carvalho, M. Mantel, and W. L. Vasconcelos, "Corrosion resistance of stainless steel coated with sol-gel silica," *J. Non-Cryst. Solids*, vol. 273, no. 1-3, pp. 135-139, August 2000.
2. C. J. Brinker, W. L. Warren, M. N. Logan, and C. S. Ashley, "Amorphous sol-gel insulating films," in *Mat. Res. Soc. Symp. Proc.*, 1992, vol. 284, pp. 469-475).
3. H. Schmidt and H. Wolter, "Organically modified ceramics and their applications," *J. Non-Cryst. Solids*, vol. 121, no. 1-3, pp. 428-435, 1990.
4. S. Komarneni, "Some significant advances in sol-gel processing of dense structural ceramics," *J. Sol-Gel Sci. Technol.*, vol. 6, no. 2, pp. 127-138, January 1996; M. L. Zheludkevich, I. M. Salvado, and M. G. S. Ferreira, "Sol-gel coatings for corrosion protection of metals," *J. Mater. Chem.*, vol. 15, pp. 5099-5111, 2005; O. Cakiroglu, L. Arda, and Y. S. Hascicek, "High voltage breakdown studies of sol-gelMgO—ZrO2 insulation coatings under various pressures at 298 K and 77 K," *Phys. C*, vol. 422, no. 3/4, pp. 117-126, 2005; I. H. Mutlu and Y. S. Hascicek, "High temperature compatible insulation for superconductors and methods of applying insulation to superconductors," U.S. Pat. No. 6,344,287, Feb. 5, 2002.
5. M. L. Zheludkevich, I. M. Salvado, and M. G. S. Ferreira, "Sol-gel coatings for corrosion protection of metals," *J. Mater. Chem.*, vol. 15, pp. 5099-5111, 2005; O. Cakiroglu, L. Arda, and Y. S. Hascicek, "High voltage breakdown studies of sol-gelMgO—ZrO2 insulation coatings under various pressures at 298 K and 77 K," *Phys. C*, vol. 422, no. 3/4, pp. 117-126, 2005; I. H. Mutlu and Y. S. Hascicek, "High temperature compatible insulation for superconductors and methods of applying insulation to superconductors," U.S. Pat. No. 6,344,287, Feb. 5, 2002; L. Malfatti and P. Innocenzi, "Sol-gel chemistry: From selfassembly to complex materials," *J. Sol-Gel Sci Technol.*, May 2011. doi:10.1007/s10971-011-2475-y, to be published; J. Gallardo, A. Duran, I. Garcia, J. P. Celis, M. A. Arenas, and A. Conde, "Effect of sintering temperature on the corrosion and wear behavior of protective SiO-based sol-gel coatings," *J. Sol-Gel Sci. Technol.*, vol. 27, pp. 175-183, 2003; I. H. Mutlu, E. Celik, and Y. S. Hascicek, "High temperature insulation coating and their electrical properties for HTS/LTS conductors," *Phys. C*, vol. 370, no. 2, pp. 113-124, 2002; H. W. Weijers, U. P. Trociewitz, K. Marken, M. Meinesz, H. Miao, and J. Schwartz, "The generation of 25.05 T using a 5.11 T Bi2Sr2CaCu2Ox superconducting insert magnet," *Supercond. Sci. Technol.*, vol. 17, no. 4, pp. 636-644, April 2004.
6. D. A. Barrow, T. E. Petroff, and M. Sayer, "Thick ceramic coatings using a sol gel based ceramic-ceramic 0-3 composite," *Surf Coat. Technol.*, vol. 76-77, pp. 113-118, 1995; E. Amerio, P. Fabbri, G. Malucelli, M. Messori, M. Sangermano, and R. Taurino, "Scratch resistance of nano-silica reinforced acrylic coatings," *Progr. Organ. Coat.*, vol. 62, no. 2, pp. 129-133, April 2008.
7. M. L. Zheludkevich, I. M. Salvado, and M. G. S. Ferreira, "Sol-gel coatings for corrosion protection of metals," *J. Mater. Chem.*, vol. 15, pp. 5099-5111, 2005.
8. W. M. Haynes, *CRC Handbook of Chemistry and Physics*, 91st ed. Boca Raton, Fla.: CRC Press, 2010, pp. 15-43.

GLOSSARY OF CLAIM TERMS

Alkyl silicate: A chemical compound comprising anionic silicon with alkyl groups attached to each oxygen atom.

Aluminum Oxide: A chemical compound with the formula $Al_2O_3$, commonly occurs in its crystalline polymorphic phase $\alpha$-$Al_2O_3$. Also known as alumina. Aluminum oxide is an electrical insulator with relatively high thermal conductivity.

Anhydrous ethyl alcohol: A chemical compound with the formula $C_2H_5OH$, also known as ethanol. Anhydrous ethyl alcohol is ethyl alcohol with a very low water content, typically less than 1 percent.

Calcination: A treatment process in which ores, minerals, or other solid materials are heated in the presence of oxygen to bring about thermal decomposition or phase transition.

Sol-gel: A stable suspension of colloidal solid particles or polymers in a liquid (sol) that act as a precursor for an integrated three-dimensional network (gel) of discrete particles or a network of polymers.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

What is claimed is:
1. A coating for a metallic tape or wire, comprising:
a material having a uniform thickness surrounding the metallic tape or wire,
wherein the material comprises:
one part by weight alkyl silicate binding material;
two parts by weight anhydrous ethyl alcohol; and
3/10 part by weight aluminum oxide powder.

2. The coating of claim 1, wherein the alkyl silicate binding material contains at least 19 percent by weight silicon dioxide.

3. The coating of claim 1, wherein the aluminum oxide powder has a particle size of about 0.3 μm.

4. The coating of claim 1, wherein the coating is a silica polymer formed from a sol-gel solution.

5. The coating of claim 1, wherein the uniform thickness is between 2 μm and 8 μm.

6. The coating of claim 1, wherein the coating is disposed on a high temperature superconducting material.

\* \* \* \* \*